May 23, 1939.  C. MACMILLAN  2,159,768
HIGH POWER FACTOR INDUCTION MOTOR
Filed May 17, 1938
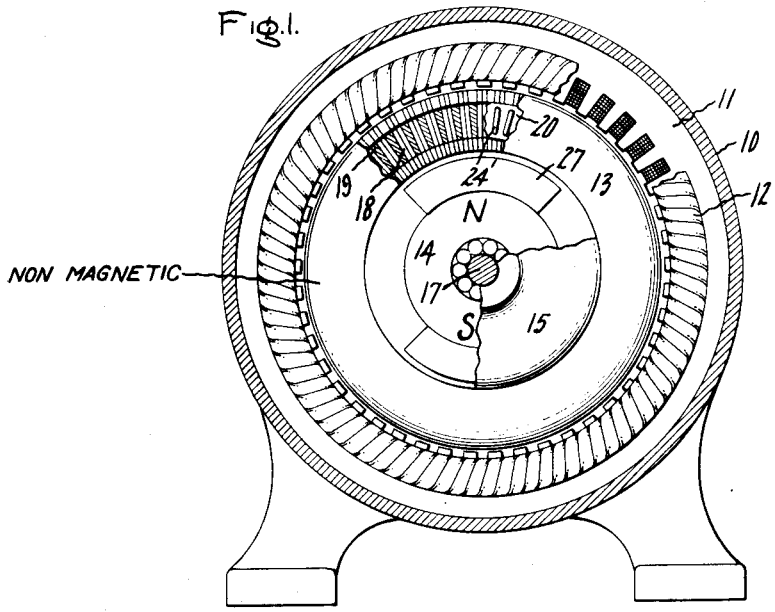
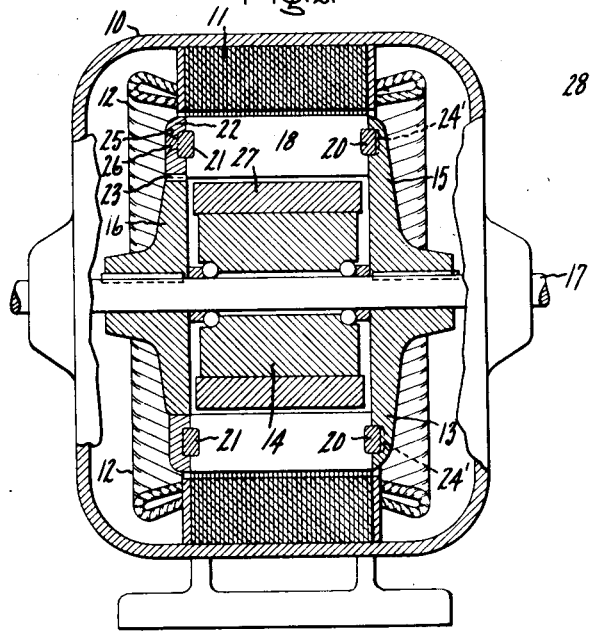
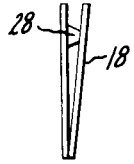
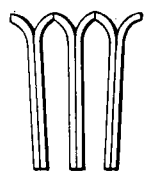
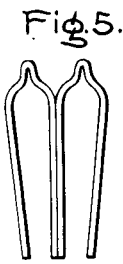
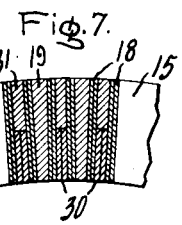
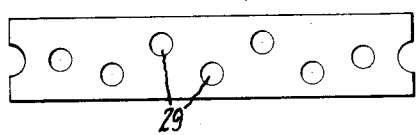
Inventor:
Campbell Macmillan,
by Harry E. Dunham
His Attorney.

Patented May 23, 1939

2,159,768

UNITED STATES PATENT OFFICE 2,159,768

HIGH POWER FACTOR INDUCTION MOTOR

Campbell Macmillan, Scotia, N. Y., assignor to General Electric Company, a corporation of New York Application May 17, 1938, Serial No. 208,396

5 Claims. (Cl. 172—274)

My invention relates to induction motors and its main object is to provide an induction motor having exceptionally high power factor. In carrying my invention into effect I provide the secondary rotor of my improved motor with an inner floating rotor for supplying a substantial part of the motor excitation and hence to raise the power factor of the motor to a high value. This floating excitation rotor preferably takes the form of a permanent magnet rotor.

Another important feature of my invention is the provision of a slotted squirrel cage rotor construction in which the magnetic material in which the squirrel cage is embedded consists of radial laminations stacked parallel with the squirrel cage bars. This construction of itself provides the squirrel cage slots and largely eliminates the expense of stamping slots in the laminations.

The features of my invention which are believed to be novel and patentable will be pointed out in the claims appended hereto. For a better understanding of my invention, reference is made in the following description to the accompanying drawing in which Fig. 1 represents a partially sectioned end view of a machine embodying my invention; Fig. 2 shows a sectional view parallel with the shaft of the machine of Fig. 1; Figs. 3, 4, 5 represent example end view shapes of different laminations that may be used; Fig. 6 represents a lamination having openings punched therein for purposes to be explained; and Fig. 7 represents a section of the laminated structure arranged for a double squirrel cage effect.

Referring now to Figs. 1 and 2 my improved motor construction uses a conventional stator construction consisting of the magnetic frame 10, slotted magnetic laminations 11 and an alternating current primary winding 12. The stator may be designed to take into consideration the decreased excitation requirements afforded by this invention. The rotor consists essentially of a secondary winding part 13 and an inner permanent magnet core part 14. The secondary winding part is carried by end spider portions 15 and 16 keyed to the shaft 17. Secured between the peripheral portions of these spider sections are magnetic laminations 18 stacked radially parallel with the shaft. These laminations extend about the rotor and are disposed somewhat like the blades of a paddle wheel. The laminations 18 are suitably grouped with intervening spaces and in the intervening spaces I place the secondary winding which is preferably of the squirrel cage type and cast in place. 19 represents the squirrel cage bars and 20 and 21 the end rings. The end spider parts 15 and 16 are preferably made of non-magnetic material, such as a non-magnetic alloy steel, or of a material which is a poor magnetic conductor. In small motors the spider material or at least the peripheral portions thereof might be made of a sufficiently good electrical conductor material to serve the purpose of end rings for the squirrel cage. One of these spider parts is preferably made in separable portions. Thus, spider 16 has an outer section 22 which is keyed to the inner section 16 in several places, one such key being indicated at 23. The purpose of making one of the end spider parts in the separable sections is to facilitate assembly. The laminations 18 are preferably copper brazed to the end spider parts. The ends of the laminations and the contacting surfaces of the supporting spider parts have recesses formed therein concentric with respect to the shaft which, when the squirrel cage winding is cast, are filled with the copper or aluminum squirrel cage winding material to form low resistance rings.

To increase the driving strength between the end spider parts and the laminated squirrel cage structure which they support, I may provide corrugations indicated in dotted lines at 24', Fig. 2 in the end ring recess provided in end shield 15. In casting the squirrel cage, the material flows into these corrugations as indicated by the protuberances 24' on the end ring 20, Fig. 1.

At the other end of the rotor the separable section 22 of the spider may be provided with several openings 25 uniformly spaced about the periphery through which the casting material is poured in the casting process. Such openings are left filled with the casting material as indicated at 26, Fig. 2 and these form driving lugs between the squirrel cage and end spider part. In casting the squirrel cage the laminations 18 may be first secured to the end spider parts 15 and 22. Then a suitable concentric form or forms are placed inside and outside the laminations. The assembly is set on end with spider part 15 uppermost and the molten material forced into the openings 25. The space for end ring 21 acts as a header so that the molten material flows through and substantially fills all of the empty spaces in the structure and as a result the squirrel cage winding is formed and assists in uniting the parts in a strong solid structure.

Using simple flat laminations 18 as in Fig. 1, the squirrel cage bars 19 are of the same radial depth as the laminations and are slightly V-shaped with their thinnest section at the bottom of the slots formed by the spacing of the laminations. In Fig. 1 the bars are spaced by two laminations. The relation between the amount of iron and squirrel cage bar material may be readily changed by reducing or increasing the number of laminations which separate adjacent bars.

The remainder of the motor consists of a permanent magnet member 14 preferably provided with soft iron pole pieces 27. Figs. 1 and 2 represent the arrangement for a 2-pole motor. In this case the cylindrical permanent magnet 14 is polarized across a diameter as indicated by the N and S letters thereon in Fig. 1. The material for this permanent magnet core is preferably the high coercive force material known as "Alnico" and may be prepared as described in United States Patent No. 1,947,274. The inner permanent magnet rotor is rotatively supported on shaft 17 by simple bearings which may be ball bearings, as indicated. The air gap between the inner polarized rotor and the inner periphery of the laminated squirrel cage structure is made as small as feasible consistent with the necessary mechanical clearance. While the cylindrical permanent magnet might be increased in diameter and the soft iron pole pieces omitted, it is preferable to use such soft iron pole pieces since they afford ample protection against demagnetization of the permanent magnet during the starting operation and also the permanent magnetic material used is somewhat more efficiently utilized when the pole pieces are used.

In starting such a motor, the inner polarized rotor will start independently of the squirrel cage secondary and thereafter run synchronously with the rotating magnetic field produced by the stator as a synchronous motor. The squirrel cage part of the rotor which is connected to the load will start in the usual manner and in operation will have a slip with respect to the rotating magnetic field, and the inner polarized rotor depending on the load.

In starting, the stator flux which penetrates to the polarized rotor or vice versa is relatively small because the secondary winding member is interposed between these flux producing means, and in inductive relation to both, and at this time when the secondary current is high and of high frequency, the counter E. M. F. produced by the squirrel cage current acts as a screen to prevent excessive interchange of flux therethrough. At the same time the secondary winding may act as such with respect to the field of the polarized rotor and assist in starting it as an inverted induction motor, if it has not already started. As soon as the polarized rotor is up to speed and in synchronism with the stator field, the danger of demagnetization is over and the increased stator flux which then reaches the inner rotor is in a direction to increase the polarization.

The induction motor action is like that of the normal induction motor except that a substantial part or all of the excitation is supplied by the unidirectional flux of the permanent magnet and hence it is possible to increase the power factor to unity or to even provide over-compensation and have the motor operate with a slightly leading power factor. Other pole numbers may be used but in all cases the multi-polar fields produced by the primary winding member and the permanent magnet member are the same as regards the number and disposition of the magnetic poles.

During starting, when the squirrel cage current is high and of high frequency, there may be appreciable eddy current loss in the rotor laminations but this produces useful starting torque and increases the starting efficiency of the motor.

A wide variety of forms of squirrel cage winding and corresponding changes in motor characteristics may be had by changes which are easily made in the form of the laminations used at 18. In Fig. 3, I have represented a spacer projection 28, one or more of which may be formed on certain of the laminations for the purpose of easily and correctly spacing these laminations during assembly. Such projections may be material which is simply punched out of the side of the lamination. Such projections also assist in anchoring the squirrel cage bars in their slots.

Figs. 4 and 5 represent forms of laminations that may be used to form partially or completely closed slots. Obviously such laminations as are shown in Figs. 4 and 5 may be combined with straight sided laminations between them to vary the spacing of the slots, and the flux density of the iron. Every other lamination of Fig. 4 can be turned end for end to provide narrower slots closed at both top and bottom. Fig. 6 represents a form of lamination provided with a number of intermediate openings 29 through which the molten casting material will flow when the winding is cast. Such a rotor will produce the effect of a number of intermediate end rings and double squirrel cage effects which may be varied by the number and position of the openings and the manner of their alignment or non-alignment in assembly.

Fig. 7 represents a further modification of the manner of forming and assembling the laminations and the formation of the squirrel cage bars. The end spider 15 is broken away to expose laminations 30 and 18 of different radial widths assembled to provide alternate slots of different depths. The shallower slots contain bars 31 and the deep slots, bars 19. It will be apparent that these same laminations could be assembled with the laminations 30 in the top of the slots instead of the bottoms. This would interchange the position of laminations 30 and bars 31 when casing the winding. Certain of the laminations 18 of Fig. 7 could be replaced by the slot closing laminations of Figs. 4 or 5.

A sufficient number of examples have been given to indicate the wide flexibility of this type of construction. The laminations used may take a wide variety of forms and shapes and may be assembled in a wide variety of different ways to obtain most any squirrel cage winding characteristic desired. The laminations are easily formed by modern stamping and forming machinery and with the exception of punching of the openings 29 of Fig. 6, they do not require the use of the small expensive dyes generally required in stamping laminations having small slot openings.

This type of laminated squirrel cage structure is particularly suitable for use with the inner floating polarized rotor. However, the invention is not confined to the particular structure described.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A secondary rotor member for an induction motor comprising a shaft, spider members forming the ends of said secondary secured to the shaft in spaced relation, a plurality of laminations of magnetic material secured between the peripheral portions of said spider members, parallel with and spaced from the shaft, said laminations being substantially radially disposed with respect to the shaft and certain of such laminations being spaced apart to provide slot spaces between them and a cast squirrel cage winding supported on said spider members with bars thereof filling said slots.

2. A secondary rotor member for an induction motor comprising a shaft, non-magnetic spider members forming the ends of said secondary secured on said shaft in spaced relation, magnetic laminations secured between said spider members, said laminations being spaced from the shaft and disposed substantially in radial planes with respect to the shaft, certain of said laminations being separated from each other to form slot spaces parallel with the shaft, recesses concentric with the shaft in the structure adjacent the end surfaces of said laminations and a cast squirrel cage winding having bars in said slot spaces and end rings in said recesses.

3. A secondary rotor for an induction motor comprising a shaft, a pair of non-magnetic spider members secured to said shaft in spaced relation and forming the ends of said secondary, a plurality of magnetic laminations secured between the peripheral portions of said spider members, said laminations being spaced from the shaft and extending substantially in radial planes therefrom, certain of said laminations being spaced apart to form slot spaces between them parallel with the shaft and having bent over outer portions for the purpose of closing said slot spaces, and a cast squirrel cage winding having bars in said slots and end rings adjacent the peripheries of said spider members and serving to strengthen said structure mechanically.

4. A secondary rotor for an induction motor comprising a shaft, a pair of spider members secured to said shaft in spaced relation and forming the ends of said secondary, a plurality of magnetic laminations secured between the peripheral portions of said spider members, said laminations being substantially disposed in planes radiating from the shaft, certain of said laminations being uniformly spaced apart to provide a plurality of slot spaces between them, a squirrel cage winding having bars cast in said slot spaces and end rings united with the spider members, certain of said laminations having openings punched therein to provide locking between the laminations and squirrel cage bars when the winding is cast.

5. A secondary rotor member for induction motors comprising inner and outer relatively rotatable parts, the outer part comprising a hollow cylindrical structure enclosing the inner part, said outer part comprising a pair of spider members forming the ends of the secondary, a slotted laminated magnetic structure supported between said spider members and a squirrel cage winding having bars in the slots of the laminated structure, said inner part comprising permanent magnet means for producing a multipolar magnetic field in the laminated magnetic outer part for the purpose of supplying a substantial part of its excitation requirements.

CAMPBELL MACMILLAN.